United States Patent Office 3,128,059
Patented Apr. 7, 1964

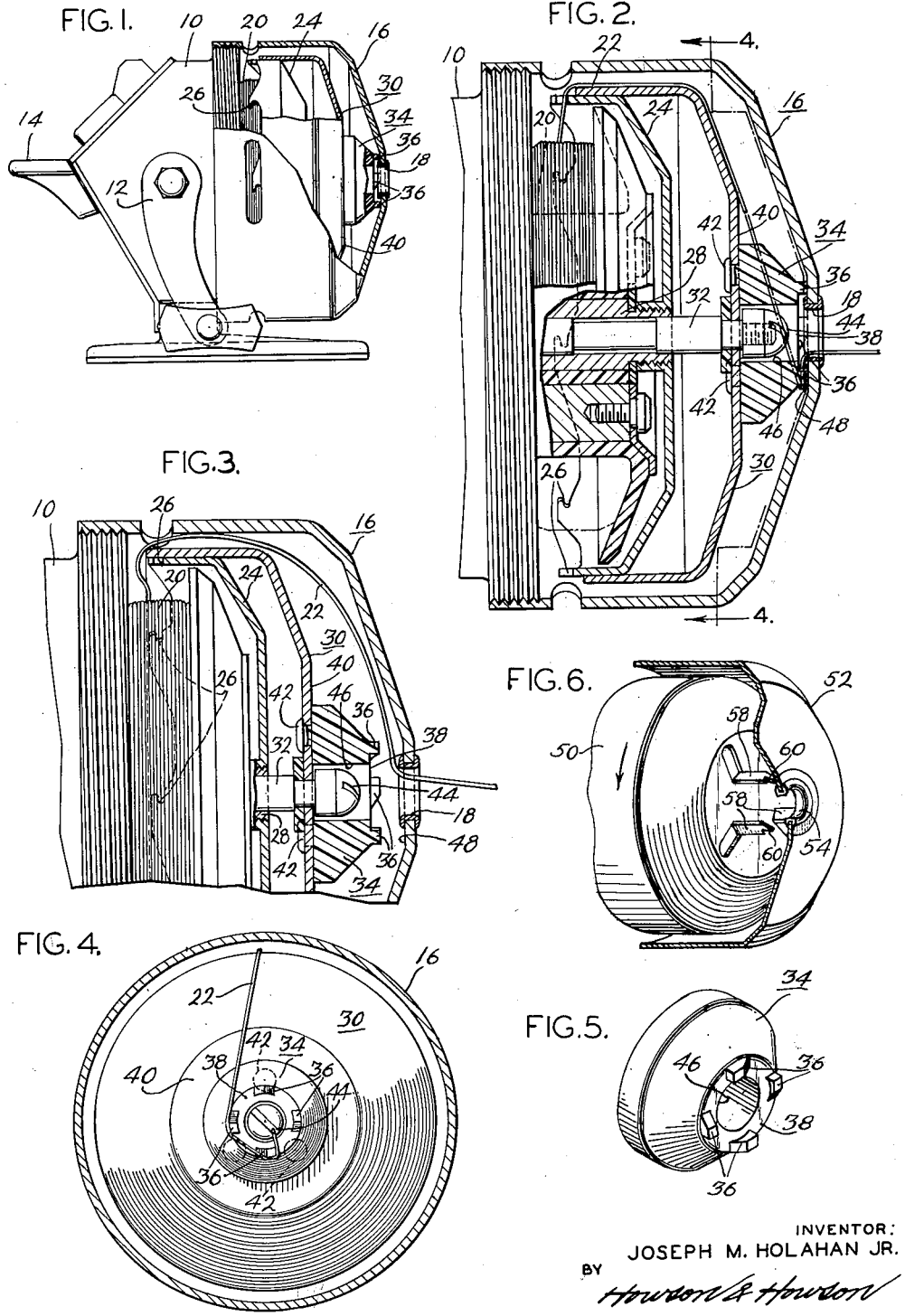

3,128,059
SPINNING REEL LOOP PICKUP
Joseph M. Holahan, Jr., Abington, Pa., assignor to True Temper Corporation, Philadelphia, Pa., a corporation of Ohio
Filed Mar. 8, 1961, Ser. No. 94,210
6 Claims. (Cl. 242—84.2)

The present invention relates generally to fishing reels and more particularly to an improvement in spinning reels of the closed face or shrouded type.

The desirable casting characteristics of the spinning type of fishing reel stem largely from the fact that the line storage spool is positioned with its axis parallel to the fishing rod shaft. The spool is generally secured to the reel so as to remain stationary during operation of the reel and rod. Such a positioning of the spool permits a smooth uncoiling of the line during casting without chance of annoying and troublesome backlash.

However, difficulty has been encountered in various types of spinning reels in rewinding the line onto the spool. The rewind means provided to return the line to the spool has in most cases been unable to consistently engage and rewind a slack line. For this reason, it has previously been necessary to manually tension the line leading into the reel to initially engage the rewinding mechanism and additionally to maintain such a tensioning on the line during the entire rewinding process to insure a continual positive engagement of the line with the rewinding mechanism.

To provide a solution to this long existing problem in spinning reels of the shrouded or closed face type, it is accordingly an object of the present invention to provide an improvement in closed face spinning reels for automatically picking up and tensioning a slack line upon initiation of the rewind phase of the casting cycle.

An additional object of the present invention is to provide a device which continually operates during the rewind phase to appropriately tension the incoming line to maintain constant engagement of the line with the rewind mechanism, thereby eliminating the need for manual tensioning.

A further object of the invention is to provide the improvement described of a construction adaptable to existing manufacturing designs of closed face spinning reels.

Another object of the invention is to provide the improvement described which is of a simple design suited for inexpensive manufacture and which will operate throughout the life of the reel without adjustment or maintenance.

Additional objects and advantages of the invention will be more readily apparent from the following detailed description of an embodiment thereof when taken together with the accompanying drawings in which:

FIG. 1 is a side elevational cutaway view of a spinning reel showing an embodiment of the present invention mounted therein;

FIG. 2 is an enlarged sectional view of the cutaway portion of the reel shown in FIG. 1 showing an embodiment of the invention engaging a line in the operating position;

FIG. 3 is a partial view of the reel as shown in FIG. 2 showing an embodiment of the invention in a disengaged position;

FIG. 4 is a view taken along line 4—4 of FIG. 2;

FIG. 5 is a perspective view of an unmounted embodiment of the invention; and

FIG. 6 is a fragmentary perspective view, partially in section of a reel illustrating a modified form of the present invention.

The embodiment of the invention shown and described in FIGS. 1 to 5, inclusive, is mounted on and used with a closed face spinning reel, the structure of which is the subject of a co-pending application, Serial Number 701,852, filed December 10, 1957, now Patent No. 3,006,573, which with the present invention has been assigned to a common assignee. However, the inclusion of a specific type of closed face spinning reel is only by way of illustration and should not be construed as limiting the reel structures to which the invention may be usefully applied.

Referring to the drawings, FIGS. 1 to 5, inclusive, illustrate loop pickup mechanism of the present invention mounted in a reel as set forth in the co-pending application referred to above. The reel basically includes a supporting frame 10 from which extend a winding handle 12 and a casting control bar 14. Removably secured to the front portion of the supporting frame 10 is a conical shaped shroud member 16 which terminates at its apex in a line guide eyelet 18. A spool 20 is mounted at the forward end of the supporting frame 10 carrying a line 22 as shown most clearly in FIGS. 2 and 3. An inner cup 24 having line winding or engaging means 26 is secured to the tubular drive shaft 28, the drive shaft and cup 30 being mounted on a shaft 32 which is adapted for rotation with the drive shaft 28 and is axially journaled therewithin, the outer cup being axially or longitudinally positioned by actuation of the casting control bar 14.

Operation of the reel as briefly described is effected by first threading the line 22 from the spool 20 over the inner and outer cups and through the line guide eyelet 18 of the shroud member 16 and thence through the rod guides in the normal manner. When casting, the control bar 14 is actuated to position the outer cup 30 so as to cover the line engaging means 26 as shown in FIG. 3. The line may now freely unwind from the spool. To rewind the line, the outer cup is moved to the forward position as shown in FIG. 2 exposing the line engaging means which upon actuation of the winding handle 12 is rotated to rewind the line onto the spool.

The problem which the present invention is designed to overcome becomes manifest after a cast has been made and the outer cup moved forward preparatory to rewinding the line. At this point the line is usually in a slack condition and because of the resulting looping of the slack line within the reel, the line frequently escapes engagement by the line engaging means. This failure of the line engaging means to engage the line has previously been rectified by the reel operating fisherman who tensions the line as it enters the shroud with the fingers of the rod supporting hand while actuating the winding handle with the other hand. Such a manual tensioning, although it has the desired effect of engaging the line with the rewind mechanism, was clearly a bothersome inconvenience.

To eliminate this manual tensioning, the present invention provides a line or loop pickup device which comprises a conical frustum shaped pickup ring 34 having spaced line engaging lugs 36 extending axially from the planar frustum surface 38. The pickup ring 34 is mounted on the front face 40 of the outer cup 30 coaxial with the cup and secured thereto by fastenings 42. To provide clearance for and access to the outer cup shaft nut 44, the pickup ring 34 is centrally bored to provide a suitably sized opening 46 therein.

The pickup ring 34 is designed so that when the outer cup 30 is in the forward position as shown in FIG. 2, the line engaging lugs 36 will be juxtaposed in close but not contacting relationship with the inner face 48 of the shroud member 16.

The operation of the reel with the improvements of the present invention attached is the same as previously described. The position of the reel components during the casting phase is shown in FIG. 3. The line 22 flows from the spool 20 passing over the smoothly finished edges of the outer cup 30 and passes through the line guide eyelet 18 of the shroud member 16. The pickup ring 34 during this casting phase does not interfere with the outflowing line 22 since it is retracted away from the inner shroud face 48 by movement of the outer cup back to the casting position.

Upon completion of the cast, the line 22 is in the slack position indicated in FIG. 3. In the same manner as described above, the outer cup 30 is advanced to the forward position as shown in FIG. 2 prior to rewinding the line on the spool. This moves the pickup ring 34 into a position adjacent the inner face 48 of the shroud 16, with the slack line 22 passing between the pickup ring lugs 36.

The inner cup 24 frictionally co-acts with the outer cup 30, and, upon rotation of the winding handle 12, causes both the inner and outer cups to rotate together as a unit. The pickup ring 34 mounted on the outer cup 30 also rotates with the cups resulting in engagement of the slack line by the pickup ring lugs 36. The line is wound about one or more of the lugs as shown in FIG. 4 thereby increasing the tension of the line between the lugs and the spool. Tensioning brings the line into the position shown in FIG. 2, which enables the line engaging means 26 of the inner cup 24 to engage the line and to carry out its rewinding function. Since the line engaging means 26 and the pickup ring lugs 36 are rotating at the same rate, the line will not be engaged by additional pickup ring lugs once engagement has been made with the line engaging means 26. For example, in FIGS. 2 and 4 the line was engaged by two pickup ring lugs at the time the line engaging means 26 engaged the line. The line will remain in engagement with the same two pickup ring lugs during the rewinding, the line gliding over the two lugs after passing through the shroud 16 and thus being tensioned continually during the rewind phase to insure continuous engagement with the line engaging means 26. After completion of the rewinding and in preparation for casting, the outer cup 30 and the pickup ring 34 are by operation of the casting control bar 14 moved back into the position shown in FIG. 3 and the line falls free of the pickup ring lugs into the slack condition shown in FIG. 3.

Although a variety of resilient and non-resilient materials could be employed for the pickup ring, nylon has been found to be especially suitable because of its light weight and non-corrosive character.

The number and shape of the lugs 36, as well as the general shape of the pickup ring 34, may be varied from the embodiment shown in the drawings and such changes are considered to be within the scope of the invention since the operative advantages of the device are retained despite such variations.

A modified form of loop pickup of the present invention is illustrated in FIG. 6 of the drawings. In this embodiment a single rotatable cup 50 is carried by a rotatable and axially movable shaft (not shown) within the shroud 52. This shroud 52 is similar to the above described shroud 16 having a central line guide eyelet 54 therein.

The cup 50 may be movable axially with respect to the shroud 52 so that in the casting position the cup is moved rearwardly away from the shroud eyelet, the rearward movement of the cup 50 being accomplished through actuation of bar 14 in the same manner as briefly described above in reference to the embodiment of FIGS. 1–5, and which is more specifically described in application, S.N. 701,852, referred to above. In the line winding position the cup will be moved forwardly toward the shroud eyelet 54.

In accordance with the present invention, in this embodiment the loop pickup mechanism comprises a plurality of lugs 58 which are formed integrally with the cup 50 and projects forwardly from the forward face of the cup toward the line guide eyelet 54. In the extended or line winding position of the cup the forward ends of the lugs 58 will terminate in close but not contacting relationship with the inner face of the shroud 52 adjacent the line guide eyelet 54. If desired, the extreme forward tips of the lugs may be shaped as illustrated in FIG. 6 of the drawings providing a line engaging hook portion 60 at the outer end of each lug 58 to securely engage the line during rotation of the cup 50 and take up any slack in the line within the shroud 52.

As suggested above, the improvement of this invention may be used with closed face spinning reels of types other than the specific reel constructions shown and described in this application. Difficulty in engaging a slack line has been encountered in other types of mechanisms in which the present invention may be successfully employed. The invention may be used with practically any closed face spinning reel.

The simplicity of construction and operation of the device as shown and described is such as to permit use of the invention with reels as presently designed with little structural modification. The improvement effectively and positively solves the problem of slack line engagement in this type of reel and is of particular benefit to fishermen, relieving them of the necessity of manually tensioning the line during the rewinding following each cast.

Manifestly, minor changes in details of construction can be effected by those skilled in the art without departing from the spirit and the scope of the invention as defined in and limited solely by the appended claims.

I claim:

1. In a closed face spinning reel comprising a housing, a spool carried by the housing, said housing having a centrally apertured shroud member, line pickup means disposed interiorly of said shroud member for winding a line passing into the reel through said aperture upon said spool and having a rotatable axially movable component axially aligned with the aperture of the shroud and spaced interiorly and retracted therefrom during casting, control means to axially move the said component toward and away from the said shroud, manual means adapted to rotate said component, loop pickup means coaxially mounted forwardly on the axially movable component and rotatable and axially movable therewith, said loop pickup means having a forward portion circumferentially surrounding said central aperture of said shroud, the control means projecting said forward portion of said loop pickup means into more closely spaced relation to the aperture in said shroud during line-winding operation than in casting and, upon rotation of the component by said manual means, the line is engaged by the forward portion of said loop pickup means to tension the slackened line thereby ensuring line engagement by the line pickup means.

2. The improvement claimed in claim 1, wherein said loop pickup means comprises a ring having a conical frustum shape, and wherein the said forward portion of the said loop pickup means comprises a lug extending from the planar surface of the frustum.

3. In a closed face spinning reel comprising a housing, a spool carried by said housing, said housing having a centrally apertured shroud member, rotatable and axially movable line-winding means disposed interiorly and adjacent of said centrally apertured shroud member for winding line passing into the reel through said aperture upon said spool, the improvement comprising a line pickup member associated with said line-winding means, a loop pickup member carried by said line-winding means projecting forwardly from said line-winding means toward and spaced from the aperture axially of said shroud member, control means projecting said line-winding means and said loop pickup means to cause said loop pickup means to engage the line passing through said aperture upon rotation and axial movement forwardly of said line-winding means to tension the line and cause it to be engaged by the said line pickup member.

4. Apparatus in accordance with claim 3 wherein said line winding means includes a rotatable cup, and wherein said loop pickup member is formed integrally with said cup and projects outwardly from the forward face of said cup.

5. Apparatus in accordance with claim 3 wherein said loop pickup member terminates in closely spaced relation with the inner face of said shroud adjacent said shroud aperture.

6. In a closed face spinning reel comprising a housing, a spool carried by the housing, said housing having a centrally apertured shroud member, line pickup means disposed interiorly of said shroud member for winding a line passing into the reel through said aperture upon said spool and having a rotatable axially movable component axially aligned with the aperture of the shroud and spaced interiorly and retracted therefrom during casting, control means to axially move the said component toward and away from the said shroud, manual means adapted to rotate said component, loop pickup means coaxially mounted forwardly on the axially movable component and rotatable and axially movable therewith, said loop pickup means having a forward portion circumferentially surrounding said central aperture of said shroud, the control means adapted to project said forward portion of said loop pickup means into more closely spaced relation to the aperture in said shroud during line-winding operation than in casting whereby, upon rotation of the component by said manual means, the line is engaged by the forward portion of said loop pickup means to tension the slackened line thereby ensuring line engagement by the line pickup means, said loop pickup means comprising a ring having a conical frustum shape, and wherein the said forward portion of said loop pickup means comprises a plurality of lugs spaced around the periphery of said planar surface of the frustum.

References Cited in the file of this patent

UNITED STATES PATENTS

| | | |
|---|---|---|
| 2,602,603 | Blissit | July 8, 1952 |
| 2,644,647 | Denison et al. | July 7, 1953 |
| 2,652,990 | Ferguson | Sept. 22, 1953 |
| 2,862,679 | Denison et al. | Dec. 2, 1958 |
| 2,988,298 | Purnell | June 13, 1961 |
| 3,025,020 | Sarah | Mar. 13, 1962 |
| 3,034,741 | Macy et al. | May 15, 1962 |

FOREIGN PATENTS

| | | |
|---|---|---|
| 820,874 | Great Britain | Sept. 30, 1959 |